United States Patent [19]

Hageman

[11] Patent Number: 4,674,941
[45] Date of Patent: Jun. 23, 1987

[54] VEHICLE RESTRAINT USING A PARALLELOGRAM LINKAGE

[75] Inventor: Martin P. Hageman, Mequon, Wis.

[73] Assignee: Kelley Company Inc., Milwaukee, Wis.

[21] Appl. No.: 800,149

[22] Filed: Nov. 20, 1985

[51] Int. Cl.$^4$ .................. B65G 67/02; B65G 69/00
[52] U.S. Cl. .................................... 414/401; 14/71.1
[58] Field of Search ............... 414/401, 396, 584, 917; 14/71.1

[56] References Cited

U.S. PATENT DOCUMENTS

| | | | |
|---|---|---|---|
| 2,693,284 | 11/1954 | Gernhardt | 414/584 |
| 2,785,807 | 3/1957 | Prowinsky | 414/917 X |
| 4,016,989 | 4/1977 | Furnari | 414/401 X |
| 4,127,856 | 11/1978 | Bickel | 340/687 |
| 4,148,498 | 4/1979 | Taylor | 280/482 |
| 4,149,469 | 4/1979 | Bigler | 414/917 X |
| 4,373,847 | 2/1983 | Hipp | 414/401 |
| 4,443,150 | 4/1984 | Hahn et al. | 414/401 |
| 4,488,325 | 12/1984 | Bennett et al. | 14/71.3 |
| 4,522,548 | 6/1985 | Oswald et al. | 414/917 X |
| 4,555,211 | 11/1985 | Metz | 410/7 X |

*Primary Examiner*—L. J. Paperner
*Assistant Examiner*—Stuart J. Millman

*Attorney, Agent, or Firm*—Andrus, Sceales, Starke & Sawall

[57] ABSTRACT

A vehicle restraint for preventing a vehicle, such as a truck, from pulling away from the loading dock during a loading operation. The vehicle restraint includes a frame or supporting structure which is mounted on the generally horizontal driveway in front of the loading dock, and a parallelogram linkage inerconnects the frame and a hook. The parallelogram linkage includes two pair of generally parallel links and the lower ends of both pairs of links are mounted for movement on the frame in a direction toward and away from the dock, while the upper ends of the links are pivotally connected to the hook. A reciprocating drive mechanism interconnects the frame and the linkage, and by moving the lower ends of the links in a direction toward the loading dock, the hook will be moved upwardly in a vertical path to engage an abutment on the rear end of the truck to prevent the truck from accidentally moving away from the loading dock. By moving the drive mechanism in the opposite direction, the lower ends of the links will be moved in a direction away from the dock to thereby lower the hook to an inoperative or storage location adjacent the driveway.

12 Claims, 4 Drawing Figures

VEHICLE RESTRAINT USING A PARALLELOGRAM LINKAGE

BACKGROUND OF THE INVENTION

Vehicle restraints have been employed to prevent accidental movement of a truck away from a loading dock during a loading operation. When the truck is parked in front of the loading dock, the rear end of the truck completely encloses the doorway in the loading dock with the result that the truck driver cannot observe the loading or unloading of cargo from the truck by a lift truck or other mechanical handling equipment. To prevent the truck from accidentally pulling away from the dock before the loading or unloading operation is completed, vehicle restraints have been used which are mounted on the loading dock and engage the ICC bar located at the rear end of the truck.

Certain types of vehicle retraints employ a pivoting hook that is pivoted either manually or through mechanical means from the storage position to the locking position where it will engage the ICC bar.

Other vehicle restraints, such as disclosed in U.S. Pat. No. 4,488,325. employ a linear moving hook which is moved vertically along the front face of the dock from a lower storage position to an upper locking position. In the vehicle restraint, as described in the aforementioned patent, an electric motor is mounted on the hook and operates through a gear transmission to rotate a pinion which is engaged with a rack mounted on the loading dock. With this construction, operation of the pinion and rack mechanism will drive the hook upwardly and downwardly between the lower inoperative position and the upper operative position where the hook is engaged with the ICC bar.

During a loading operation, the truck bed may rise and fall relative to the dock as a fork lift truck moves between the dock and the truck bed. The truck bed will also rise relative to the dock as cargo is unloaded from the truck bed, and conversely, the truck bed will fall relative to the dock as cargo is loaded onto the truck bed and the truck springs are compressed. It is important that a vehicle restraint have the capability of maintaining the hook in engagement with the ICC bar as the truck bed floats relative to the dock. In certain instances, depending upon the type of truck, the float can be up to ten inches.

SUMMARY OF THE INVENTION

The invention is directed to an improved vehicle restraint for preventing accidental movement of a truck or other vehicle away from a loading dock during a loading operation. In accordance with the invention, the vehicle restraint includes a frame or supporting structure that is mounted on the generally horizontal driveway or foundation in front of the loading dock. A parallelogram-type linkage interconnects the frame and a restraining member, which is preferably in the shape of a hook. The linkage includes two pair of generally parallel arms or links with the lower ends of the links being mounted for travel on the frame in a direction toward and away from the loading dock, while the upper ends of the links are pivotally connected to the hook. A drive mechanism, such as a fluid cylinder, interconnects the linkage with the frame, and through operation of the drive mechanism the lower ends of the links can be moved inwardly toward the loading dock, causing the hook to move upwardly in a linear path into engagement with the ICC bar on the truck or vehicle. With the hook engaged with the ICC bar, the truck will be prevented from moving outwardly away from the dock while the loading or unloading operation is proceeding.

By operating the drive mechanism in the opposite direction, the lower ends of the links are moved in a direction away from the dock to lower the hook out of engagement with the ICC bar and permit the truck to move away from the dock.

The invention provides a positive lock of the ICC bar of the truck to the driveway adjacent the loading dock to prevent the truck from accidentally pulling away from the dock during the loading operation. The frame or supporting structure is connected to the driveway through a series of anchor bolts, that are subjected primarily to shear stress when a pulling load is applied by the truck to the engaged hook. This anchoring mechanism is a substantial improvement over prior art types in which the vehicle restraint is mounted solely to the front face of a dock so that the anchor bolts are subjected primarily to tensile stress under load.

The use of a gas cylinder as the drive mechanism enables the hook to automatically follow upward and downward movement of the ICC bar and truck bed, as the truck bed floats due to cargo being loaded on or removed from the truck bed. More specifically, as weight is applied to the truck bed, causing the bed to lower, the ICC bar will force the hook downwardly compressing the gas in the fluid cylinder to accommodate the downward float of the truck bed.

Conversely, if the truck bed moves upwardly, the pressure within the cylinder will move the hook upwardly to accommodate the upward float of the truck bed.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
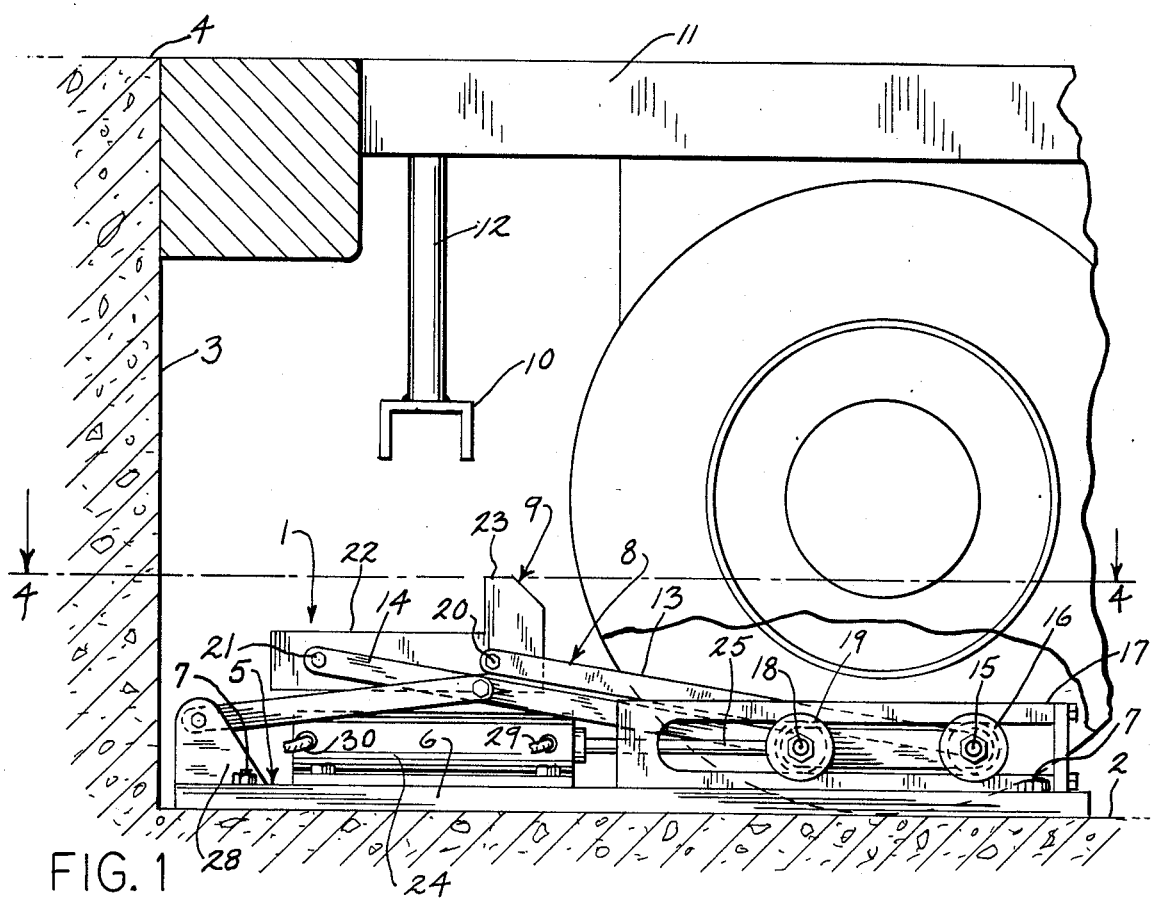
FIG. 1 is a side elevation of the vehicle restraint of the invention in the lowered or storage position.

The drawings illustrate a vehicle restraint 1 mounted on a generally horizontal driveway 2 in front of the front vertical face 3 of a loading dock 4.

The vehicle restraint includes a fixed frame or supporting structure 5 which is composed of a base plate 6 anchored to driveway 2 through a plurality of conventional anchor bolts 7.

In accordance with the invention, a generally parallelogram shaped linkage 8 interconnects the frame 5 with a vehicle restraining member 9 that is adapted to engage the ICC bar 10 located at the rear of a truck 11. ICC bar 10 is a generally horizontal bar or beam which is suspended through vertical supports 12 from the rear end of the bed of the truck and serves to prevent an automobile from underriding the truck in the event of a rear end collision.

Linkage 8 includes two pair of generally parallel arms 13 and 14. The lower ends of links 13 are connected together by shaft 15 and rollers 16 are journalled on the ends of shaft 15 and ride in guide tracks 17 on frame 5. Similarly, the lower ends of links 14 are connected by a shaft 18 which carries rollers 19 that ride in the track 17.

Figure 2:
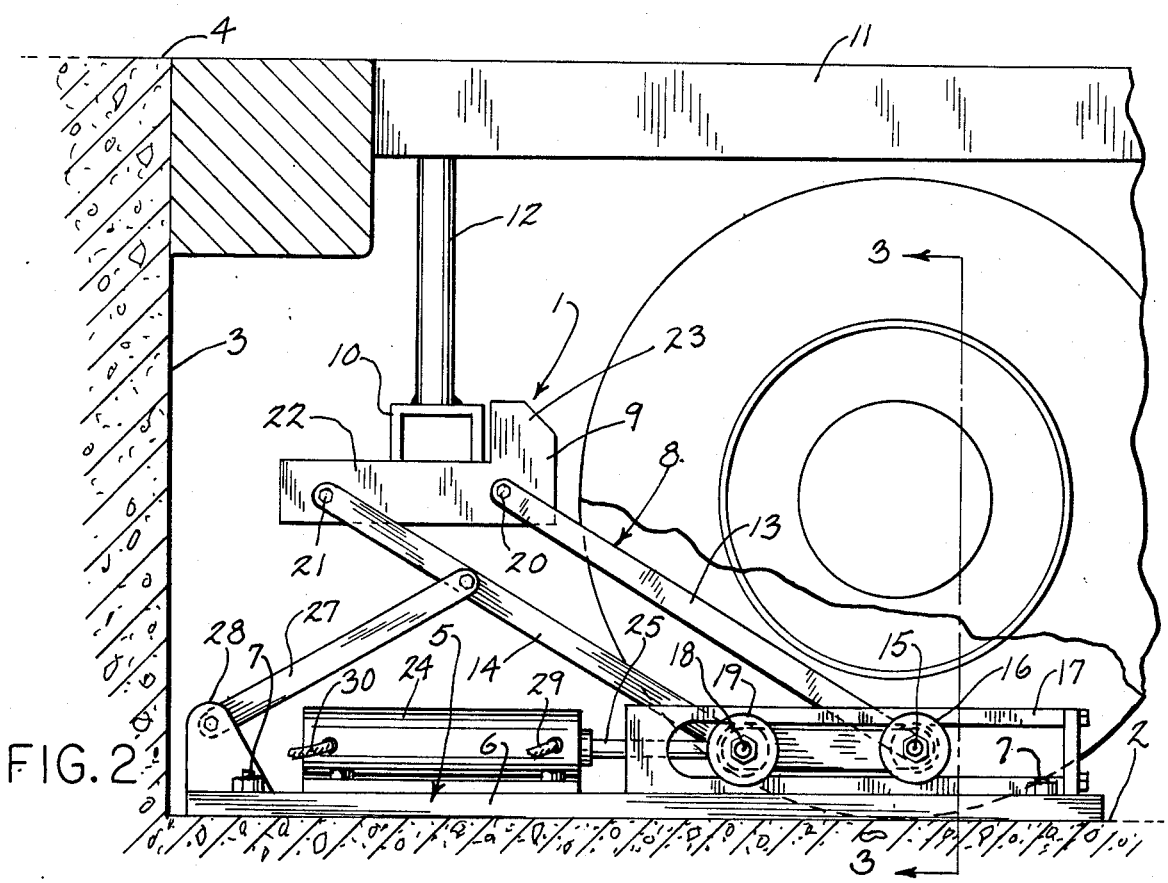
FIG. 2 is a view similar to FIG. 1 showing the vehicle restraint in the operative position with the hook engaged with the ICC bar of a truck.
Figure 3:
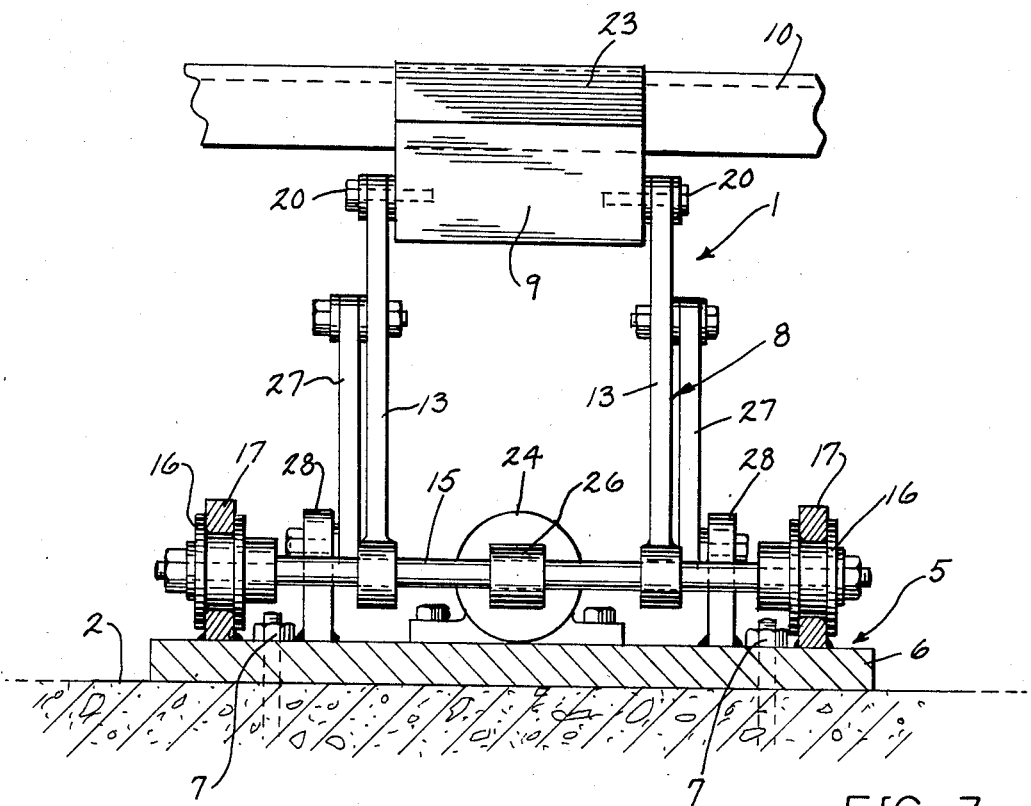
FIG. 3 is a transverse section taken along line 3—3 of FIG. 2.
Figure 4:
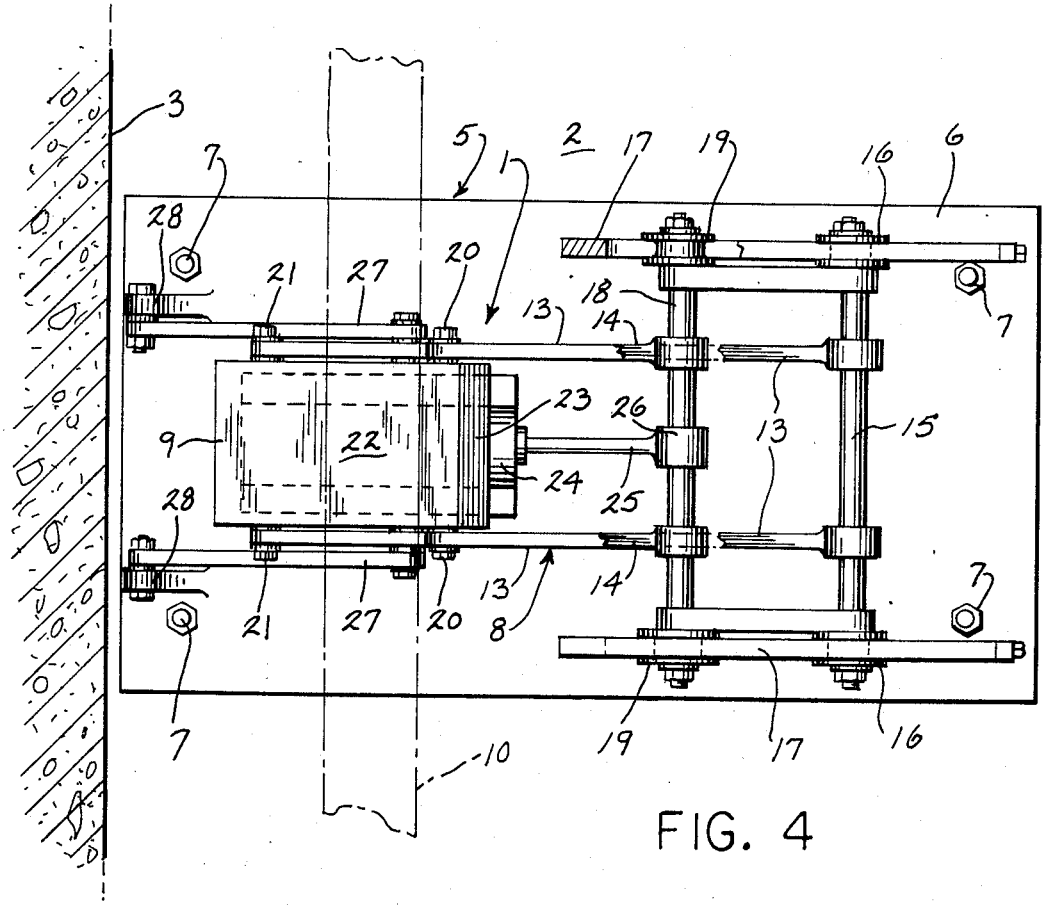
FIG. 4 is a horizontal section taken along line 4—4 of FIG. 1.

As shown in FIGS. 1 and 2, the upper ends of links 13 are pivotally connected to restraining member 9 at pivots 20 while the upper ends of arms 14 are similarly connected to member 9 at pivots 21.

With this linkage arrangement, the restraining member 9 can be moved vertically in a linear path from a lower storage or inoperative position to an upper operative position where it is engaged with the ICC bar. Restraining member 9, as illustrated in FIG. 1, has a hook-like or L-shape, being composed of a straight section 22 and an upwardly extending tip 23.

To move the restraining member 9 between the inoperative and operative positions, a fluid cylinder mechanism interconnects the frame 5 and the linkage 8 and includes a cylinder 24 mounted on frame 5. Mounted for sliding movement within cylinder 24 is a piston which carries a piston rod 25 that extends outwardly from the cylinder and is connected through trunnion 26 to shaft 18.

With the piston rod 25 extended, links 13 and 14 will be positioned at an acute angle with respect to the driveway, as shown in FIG. 1 and hook or restraining member 9 will be in a lower or storage position. By introducing air into one end of cylinder 24 through line 29, the piston rod 25 will be retracted, moving the lower ends of links 13 and 14 in a direction toward loading dock 3 and causing the hook 9 to move upward in a vertical linear path into engagement with the ICC bar 10, as shown in FIG. 2.

After the loading operation has been completed, air is introduced into the opposite end of the cylinder through line 30, extending the piston rod 25 and moving the lower ends of the links 13 and 14 in a direction away from dock 3. This movement of the linkage 8 will lower the hook 9 out of engagement with the ICC bar 10 to permit the truck to pull away from the loading dock.

By utilizing air, or other gas, as the operating medium for the fluid cylinder 24, the vehicle restraint will be able to automatically accommodate upward and downward float of the truck bed during a loading operation. For example, if the truck bed is lowered relative to the dock as when cargo is applied to the truck bed, downward movement of the truck bed and ICC bar will move the hook downwardly to compress the gas in the cylinder 24 and automatically retain the hook in engagment with the ICC bar. Conversely, if the truck bed should rise, as when cargo is removed from the truck bed, the fluid pressure in cylinder 24, will automatically cause the piston rod 25 to retract to enable the hook 9 to follow the upward movement of the truck bed and ICC bar 10. With this arrangement, the vehicle restraint can readily accommodate float up to ten inches or more, as may be encountered by trailers, as well as city delivery trucks.

If the truck should attempt to pull away from the dock while the hook 9 is engaged by the ICC bar 10, the stress applied to the anchor bolts 7 will be predominantly shear stress. As the anchor bolts are subjected primarily to shear stress, the size of the anchoring bolts can be reduced over a system employing anchor bolts that are subjected primarily to tensile stress.

While the drawings have illustrated a gas cylinder as the drive mechanism for operating the linkage, it is contemplated that other drive mechanisms, either mechanical or hydraulic, can by utilized, such as a lead screw, rack and pinion, hydraulic cylinder or the like. However, the use of a gas cylinder has the advantage that it enables the hook to automatically follow float of the truck bed. With other types of drive mechanisms, it may be necessary to include an additional biasing mechanism to follow the float.

Various modes of carrying out the invention are contemplated as being within the scope of the following claims particularly pointing out and distinctly claiming the subject matter which is regarded as the invention.

I claim:

1. A vehicle restraint for preventing accidental movement of a vehicle away from a structure, comprising a frame to be mounted on the structure, a vehicle restraining member having an operative position wherein said member is engaged with an abutment on a vehicle to prevent the vehicle from moving away from said structure and having an inoperative position, said vehicle restraining member having a generally straight inner section and an upwardly extending outer section, said inner section being disposed in a generally horizontal attitude when said restraining member is in the operative position and in the inoperative position, a parallelogram-type linkage pivotally interconnecting said frame and said member, and drive means for pivoting said linkage and moving said member between said inoperative position and said operative position.

2. The vehicle restraint of claim 1, wherein said structure comprises a generally horizontal driveway located in front of a loading dock, said frame being mounted on said driveway.

3. The vehicle restraint of claim 2, wherein said linkage is constructed and arranged to move said member in a substantially vertical linear path between said inoperative and operative positions.

4. The vehicle restraint of claim 1, wherein said linkage comprises a pair of generally parallel spaced links, corresponding ends of said links being pivotally connected in spaced relation to said member and opposite corresponding ends of said links being mounted for movement relative to said frame.

5. The vehicle restraint of claim 4, and including guide means disposed on said frame for mounting said opposite ends for linear movement.

6. In combination with a loading dock having a generally vertical face and having a generally horizontal driveway extending outwardly from said face, a vehicle restraint to prevent a truck from accidentally pulling away from said loading dock, said vehicle restraint comprising a supporting structure mounted on said driveway, a vehicle restraining element movable between an inoperative position and an operative position where said restraining element engages an abutment on said vehicle to prevent movement of said vehicle in a direction away from said dock, a generally parallelogram shaped linkage interconnecting said supporting structure and said restraining element, said linkage including a pair of generally parallel spaced links, corresponding ends of said links being pivotally connected to said restraining member and opposite corresponding ends of said links being mounted for linear movement in said direction relative to said supporting structure, and fluid cylinder means interconnecting said supporting structure and said linkage, said fluid cylinder means including a cylinder member and a piston member, one of said members being connected to said supporting structure and the other of said members being connected to said linkage, said fluid cylinder means being constructed and arranged so that introduction of fluid into one end of said cylinder will cause said links to move in said direction away from said dock to thereby move said restraining element to the inoperative position and introduction of fluid into the opposite end of said cylinder will cause said opposite ends of said links to move in a direction toward said dock to move said restraining element to said operative position.

7. The combination of claim 6, and including guide means on said supporting structure for guiding the opposite ends of said links in linear movement.

8. The combination of claim 6, wherein said fluid cylinder is a gas cylinder.

9. The combination of claim 6, and including an arm pivotally interconnecting one of said links and said supporting structure.

10. The combination of claim 6, wherein said restraining element comprises a generally straight inner section extending outwardly from said face and an outer section extending upwardly from said inner section.

11. The combination of claim 9, wherein said arm extends upwardly and outwardly with respect to said face.

12. In combination with a loading dock having a generally vertical face and having a generally horizontal driveway extending outwardly from said face, a vehicle restraint to prevent a truck from accidentally pulling away from said loading dock, said vehicle restraint comprising a supporting structure mounted on said driveway, a vehicle restraining element movable between in inoperative position and an operative position where said restraining element engages an abutment on said vehicle to prevent movement of said vehicle in a direction away from said dock, a generally parallelogram-shaped linkage interconnecting said supporting structure and said restraining element, said linkage including a pair of generally parallel spaced links, corresponding ends of said links being pivotally connected to said restraining member, means for mounting opposite corresponding ends of said links for linear movement in said direction relative to said supporting structure, and gas cylinder means interconnecting said supporting structure and said linkage, said gas cylinder means including a cylinder member connected to said supporting structure and a piston member slidable within said cylinder member and connected to said linkage, said gas cylinder means being constructed and arranged so that introduction of gas into one end of said cylinder will cause said opposite ends of said links to move in said direction away from said dock to thereby move said restraining element to the inoperative position and introduction of gas in the opposite end of said cylinder will cause said opposite ends of the links to move in a direction toward said dock to move said restraining element to the operative position.

* * * * *